US009352649B2

(12) United States Patent
Viel et al.

(10) Patent No.: US 9,352,649 B2
(45) Date of Patent: May 31, 2016

(54) ACCESSORY RELAY HAVING AN EXTENDED SERVICE LIFE

(75) Inventors: Julien Viel, Argenteuil (FR); Guy Desme, Ballancourt sur Essonne (FR); Claude Gallo, Saint Ouen en Brie (FR)

(73) Assignees: SNECMA, Paris (FR); HISPANO SUIZA, Colombes (FR)

( * ) Notice: Subject to any disclaimer, the term of this patent is extended or adjusted under 35 U.S.C. 154(b) by 0 days.

(21) Appl. No.: 14/128,909

(22) PCT Filed: Jun. 21, 2012

(86) PCT No.: PCT/FR2012/051423
§ 371 (c)(1),
(2), (4) Date: Dec. 23, 2013

(87) PCT Pub. No.: WO2012/175884
PCT Pub. Date: Dec. 27, 2012

(65) Prior Publication Data
US 2014/0150575 A1   Jun. 5, 2014

(30) Foreign Application Priority Data

Jun. 24, 2011   (FR) ...................... 11 55626

(51) Int. Cl.
| F02C 7/32 | (2006.01) |
| F02C 7/06 | (2006.01) |
| H02K 5/173 | (2006.01) |
| B64D 41/00 | (2006.01) |
| F01D 25/16 | (2006.01) |
| B60K 25/06 | (2006.01) |
| F02C 7/36 | (2006.01) |

(52) U.S. Cl.
CPC .............. *B60K 25/06* (2013.01); *B64D 41/007* (2013.01); *F01D 25/162* (2013.01); *F02C 7/06* (2013.01);

(Continued)

(58) Field of Classification Search
CPC .......... F02C 7/32; F02C 7/06; F05D 2220/50; H02K 7/1823; H02K 5/161; H02K 5/1732; F01D 25/162; F01D 25/16; B64D 2041/002; B64D 41/007; B64D 41/00
USPC ................. 74/15.63, 15.6, 11, 606 R; 60/802
See application file for complete search history.

(56) References Cited

U.S. PATENT DOCUMENTS

| 4,640,153 A | 2/1987 | Brogdon et al. | |
| 2004/0098956 A1* | 5/2004 | Care ..................... | B01D 45/14 55/400 |

(Continued)

FOREIGN PATENT DOCUMENTS

| DE | 954 481 | 12/1956 |
| EP | 1 574 688 | 9/2005 |

(Continued)

OTHER PUBLICATIONS

International Search Report Issued Aug. 14, 2012 in PCT/FR12/051423 Filed Jun. 21, 2012.

*Primary Examiner* — Keith Frisby
(74) *Attorney, Agent, or Firm* — Oblon, McClelland, Maier & Neustadt, L.L.P

(57) ABSTRACT

An accessory relay for a turbine engine, including a housing in which at least one gear wheel is installed for mechanically driving an accessory mounted on the housing, the gear of the wheel being driven via an input shaft supplying torque required for the mechanical drive, the shaft of the wheel being supported by at least two ball or roller bearings, and passing through at least one of the walls of the housing via an opening positioned opposite the accessory and closed by a first accessory cover attached onto the housing, wherein, for at least one of the gear wheels, the shaft thereof passes through two walls of the housing via openings closed by covers attached onto the housing, and the outer races of the two bearings are supported by the covers.

6 Claims, 3 Drawing Sheets

(52) U.S. Cl.
CPC ... *F02C 7/32* (2013.01); *F02C 7/36* (2013.01); *B64D 2041/002* (2013.01); *F05D 2220/50* (2013.01); *F05D 2260/4031* (2013.01)

(56) References Cited

U.S. PATENT DOCUMENTS

2005/0183529 A1   8/2005   Miller
2008/0053257 A1*  3/2008   Dusserre-Telmon et al. ..... 74/11
2009/0309461 A1   12/2009  Berenger et al.

FOREIGN PATENT DOCUMENTS

| | | |
|---|---|---|
| EP | 1 994 269 | 11/2008 |
| FR | 2 556 413 | 6/1985 |
| FR | 2 897 895 | 8/2007 |
| FR | 2 905 985 | 3/2008 |

* cited by examiner

_US 9,352,649 B2_

ACCESSORY RELAY HAVING AN EXTENDED SERVICE LIFE

BACKGROUND OF THE INVENTION

1. Field of the Invention

The field of the present invention is that of turbine engines and, more particularly, that of their accessory housing, known generally under the name accessory relay or accessory gearbox (AGB).

2. Description of the Related Art

Some of the power generated by a turbojet engine is used in order to supply power to various items of equipment of the turbojet engine. This power is taken mechanically from the shaft of the high-pressure (HP) body of the turbojet engine by a power take-off shaft which drives an input shaft in the accessory gearbox. This housing contains a number of gears linked to equipment or accessories, such as for example an electric generator, a starter, an alternator, hydraulic pumps, fuel pumps or oil pumps, etc. These various accessories are driven mechanically by the input shaft in the AGB which transmits to each of them, via the gears of the AGB, some of the power taken from the HP shaft.

The AGB generally comprises a housing manufactured by casting an aluminium alloy, which forms a compartment, closed above and below by two substantially parallel walls, in which are disposed the gear wheels which drive the accessories. Each gear wheel comprises a shaft which is capable of receiving the drive shaft of an accessory and one of them is likewise linked to the input shaft in the AGB. The different accessories driven by the AGB are mounted directly on the cast housing, the drive shafts of these accessories passing through cutouts made in one of the walls of this housing in order to drive the accessories and being dimensioned to enable mounting of the corresponding gear wheel inside the housing. The gear wheels are positioned in the cast housing by being supported, on the one hand, by the wall of the housing which is opposite the cutout for passage of the drive shaft thereof and, on the other hand, by a removable cover which is attached to the cut-out wall of the housing. As a general rule, without this configuration being mandatory, the shaft of the gear wheel is supported, on the one hand, by the outer race of a roller bearing attached to the uncut base wall of the housing and, on the other hand, by the outer race of a ball bearing attached to the cover associated with said accessory.

Such configurations are described, for example, in the patent applications FR 2556413 or DE 954481 which relate to accessory gearboxes in which the drive shafts of the accessories are supported by bearings of which the outer races are supported by the gearbox housing.

The metal generally used in aeronautics to produce the housing of the accessory gearbox is an aluminium alloy known by the AFNOR designation AS7G06 (or A357 as its trade name), which has a low mass and exhibits useful mechanical characteristics. The cover, for its part, is made of another aluminium alloy, with the trade name AU2GN (i.e. AlCu2MgNi or 2618A as its AFNOR designation). Said alloy has inter alia the advantage of retaining good mechanical resistance even if the temperature increases, up to a value of approximately 150° C.

On the other hand, the alloy AS7G06 has the drawback that its hardness declines with temperature and vibration of the pins which attach the outer race of a roller bearing have been noted on engines in use. The incidents which occur result in fact from the heating of the casing due to an accessory, such as for example a permanent magnet alternator which supplies a substantial heat flow and heats the aluminium alloy to the point where it reaches a critical temperature, or also result from a high level of vibration which is generated by this same accessory or by the input shaft in the AGB.

BRIEF SUMMARY OF THE INVENTION

The object of the present invention is to remedy these drawbacks by proposing an improved accessory housing, that is to say, in particular, in which the stability of the attachment means of the gear wheels does not degrade when the operating temperature of the AGB increases.

To this end, the invention relates to an accessory gearbox for a turbine engine comprising a housing in which at least one gear wheel is installed for mechanically driving an accessory mounted on said housing, the gear of said wheel being driven via an input shaft supplying the torque required for said mechanical drive, the shaft of said wheel being supported by at least two ball or roller bearings, and passing through at least one of the walls of said housing via an opening positioned opposite said accessory and closed by a first accessory cover attached to the housing, characterised in that, for at least one of the gear wheels, the shaft thereof passes through two walls of the housing via openings closed by covers attached to said housing, and in that the outer races of said two bearings are supported by said covers.

The transfer of the bearing support from the housing towards one of the covers thereof makes it possible, by choosing a more heat-resistant metal than the alloy of the housing, to increase the service life of the accessory gearbox, by reducing the damage suffered because of the heating of the housing in the region of the bearings of the gear wheels.

Advantageously said gear wheel is coupled to the input shaft in addition to the coupling thereof to an accessory supported by said housing, the outer race of one of said bearings being attached to the cover associated with the input shaft and the outer race of the other bearing being attached to the cover associated with the shaft of said accessory.

Said gear wheel is preferably coupled to an alternator.

In a particular embodiment said cover associated with said accessory comprises an axial cylindrical extension extending inside said corresponding opening.

BRIEF DESCRIPTION OF THE SEVERAL VIEWS OF THE DRAWINGS

Said axial cylindrical extension advantageously co-operates with said corresponding opening in order to ensure the positioning of said cover on said housing.

The invention will be better understood, and other aims, details, characteristics and advantages thereof will become more clearly apparent in the course of the following detailed explanatory description of an embodiment of the invention given by way of purely illustrative and non-limiting example, with reference to the appended schematic drawings.

In these drawings:

FIG. 1 shows a partial sectional view of an accessory gearbox according to the prior art, FIG. 2 shows a partial sectional view of an accessory gearbox according to an embodiment of the invention;

FIG. 3 shows a perspective view of the housing of the accessory gearbox according to FIG. 2 and one of the covers thereof, and FIG. 4 shows a perspective view of the mounting of the outer race of a bearing on the cover of FIG. 3.

DETAILED DESCRIPTION OF THE INVENTION

Figure 1:
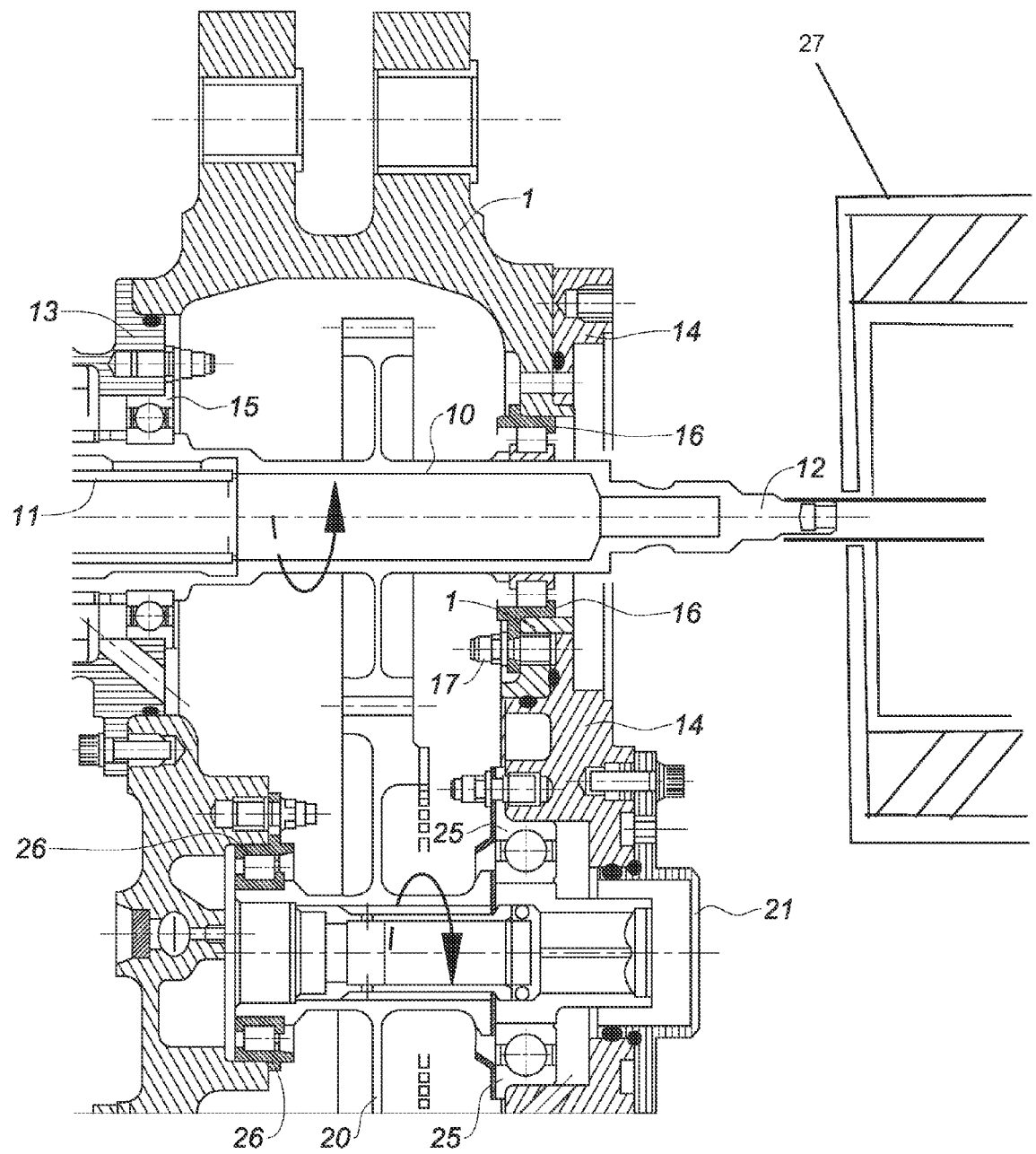

With reference to FIG. 1, one end of the accessory gearbox of a turbine engine according to the prior art is shown in section. Said accessory gearbox consists of a housing, made of AS7G06, in which are disposed gears intended to receive the drive shaft of one of the accessories attached to the accessory gearbox. The drawing shows two gears: the first gear 10 is attached to the input shaft 11 in the AGB and comprises an extension 12 forming the drive shaft of an accessory, in this case a permanent magnet alternator 27; the second gear 20 only comprises a hub in which a drive shaft can be installed, such as for example a shaft for manually driving the gear train.

Once the gear wheels are in place in the housing 1, the openings through which the drive shafts of the accessories pass are closed by covers in such a way as to ensure the sealing of the assembly and the seating of one of the bearings of the gear wheel shaft. In the case of the first gear 10, an input shaft cover 13 closes the opening situated beside the input shaft 11 and a first accessory drive cover 14 closes the opening through which the first drive shaft 12 passes. The first cover 14 also closes the opening through which the shaft of the second gear wheel 20 passes. Moreover, access to the second gear is closed by a second cover 21 when this gear is not used. On each of the gears it will be noted that they are supported by bearings: a ball bearing held in place by the cover closing the opening enabling the passage of the corresponding drive shaft and a roller bearing which is attached to the corresponding base wall of the housing 1, that is to say the wall opposite the wall in which the opening is made for the passage of the corresponding shaft. Thus the outer race 15 of the ball bearing of the first gear 10 is attached to the input shaft cover 13 by means of the screws/nuts or pins/nuts type whilst the outer race 16 of the roller bearing of this same first gear is attached directly to the base of the housing 1, here also by assembly means 17 of the screws/nuts or pins/nuts type. The same applies to the second gear, of which the outer race 25 of the ball bearing thereof is attached to the first accessory drive cover 14 (which, as indicated previously, is common to the openings of the two first gears) whilst the race 26 of the roller bearing thereof is attached to the corresponding base of the housing 1.

The problem encountered with this prior art is that the attachment means 17 of the outer race 16 of the roller bearing are highly stressed by the vibrations generated by the input shaft and/or by the permanent magnet alternator and that the metal from which the housing is produced loses its characteristics of hardness when the temperature increases. However, it has been found that the presence of an alternator, such as a permanent magnet alternator, at the end of the first drive shaft 12 is of a type to produce such a temperature increase.

Thus deteriorations have been noted in the stability of the attachment means 17 of the outer race in the metal of the housing 1.

Figure 2:
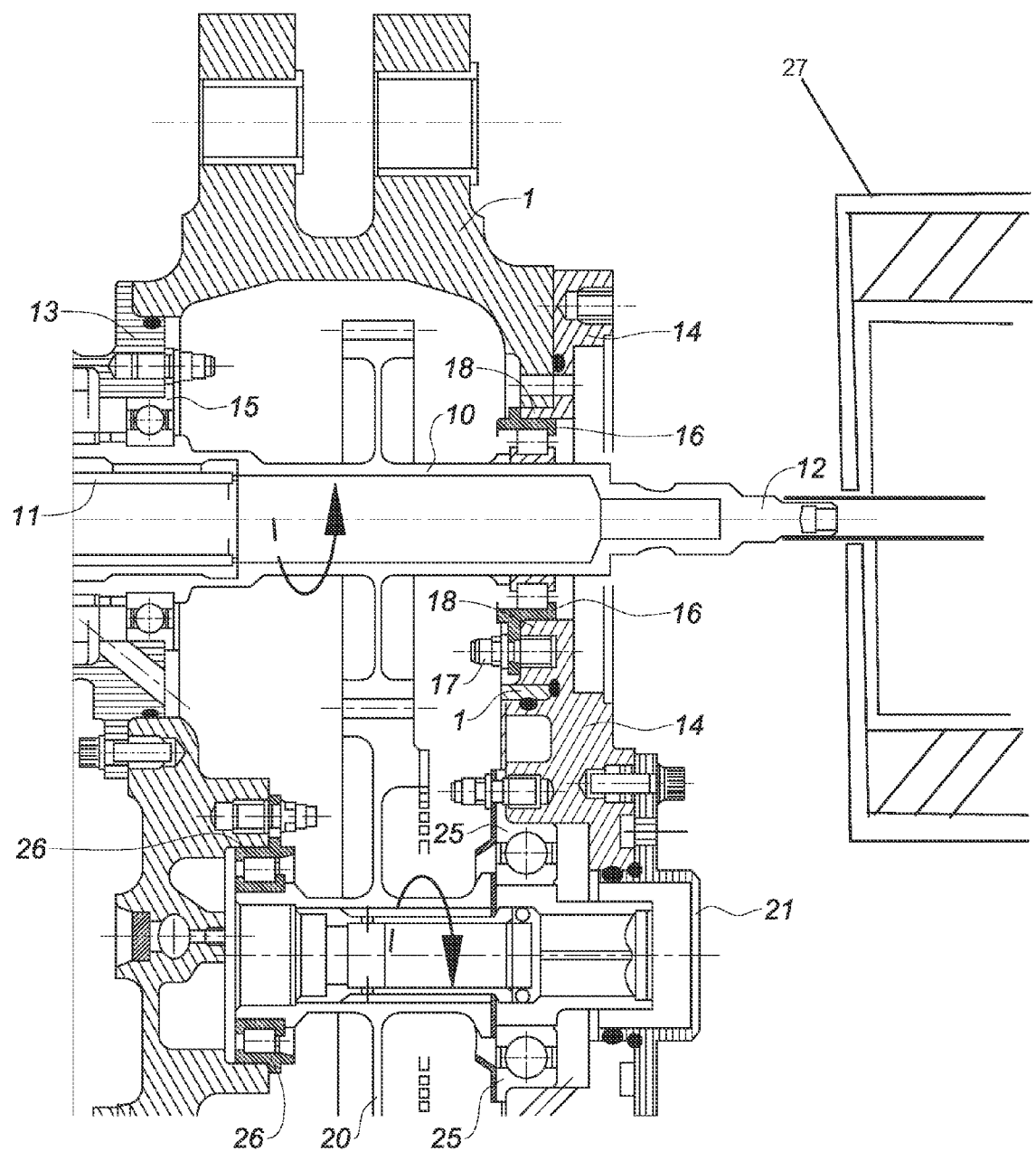

FIG. 2 shows the same accessory gearbox, modified according to the invention. The elements having the same function as those of FIG. 1 bear the same number and the elements which have not been modified are not described again.

In this configuration the outer race of the roller bearing 16 of the first gear is no longer attached to the housing 1 made of AS7G06, but on an extension 18 of the corresponding cover 14, which extends axially (with reference to the direction of the drive shaft of the corresponding accessory) and which penetrates into the opening 19 produced in the housing 1. The stability of the outer race of the roller bearing is then ensured by an aluminium alloy AU2GN, which is more temperature-resistant than the alloy from which the housing is made. In contrast to the prior art the housing 1 does not comprise attachment means for the outer race of the roller bearing of the first gear 10, or means for centering this race in relation to the housing 1. The assembly of these means is transferred to the accessory drive cover 14.

Figure 3:
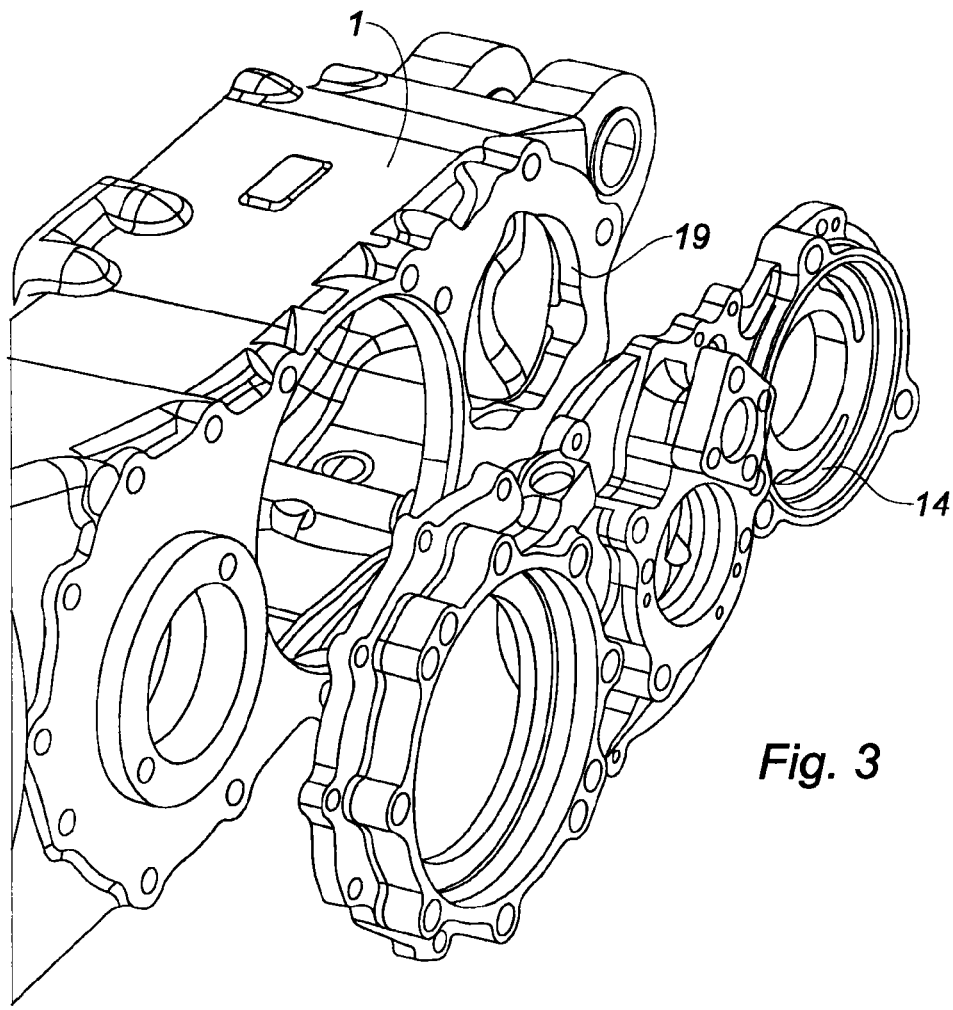

FIG. 3 shows a perspective view of the same portion of the accessory gearbox housing 1 as FIG. 2, with the openings on one of the walls thereof which are closed in use by the first accessory drive cover 14.

Figure 4:
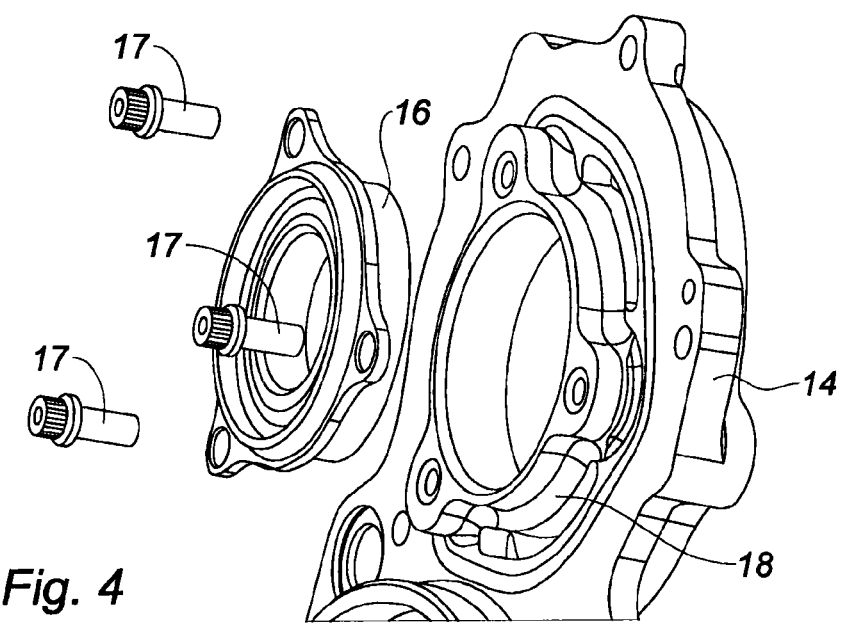

FIG. 4 shows the way in which the outer race 16 of the roller bearing of the first gear 10 is attached to the accessory drive cover 14. Whereas in the prior art the face of the cover 14 which faces the housing 1 was flat and only pierced by an opening intended to receive a cylindrical extension of the housing 1 in order to ensure the positioning of the cover 14 on the housing 1 and the centering of the drive shaft of the corresponding accessory, in the invention it is the cover 14 which has a cylindrical extension 18 in the region of the first gear 10 and the external face of the housing 1 which is flat and has a cutout 19 capable of receiving this extension 18. On this cylindrical extension, oriented axially, three projections are shown which are pierced by threaded bores, in which the attachment means 17 of the outer race 16 of the roller bearing of the first gear 10 can be inserted. The centering of the drive shaft 12 in the region of the roller bearing thereof is ensured by the cover 14, which is itself positioned with reference to one of the cutouts of the housing, in association with an element of the pin type which prevents rotation around this cutout; in a particular embodiment this positioning can be ensured by the co-operation of the cylindrical extension 18 with the cutout 19 of the first gear.

The specificity of the invention with respect to the prior art consists in the transfer, from the housing 1 to the corresponding cover 14, of the attachment of the outer race of the roller bearing. The fact that the alloy used for the production of the cover 14 is more resistant to high temperatures than that of the housing 1 provides better stability of the attachment means 17 and the absence of the degradations previously encountered.

It should also be noted that the solution proposed for the invention makes it possible to re-use AGB housings which have undergone damage, after an operation of machining of the wall of the housing which received the outer race of the roller bearing, so that it can now receive the extension 18 of a first cover 14. Thus the repair of a damaged AGB only requires the provision of a new first cover 14, without discarding the entire housing 1.

The invention claimed is:

1. An accessory gearbox for a turbine engine, comprising:
   a housing;
   a gear wheel installed in the housing for mechanically driving an accessory mounted on the housing; and
   an input shaft which drives the gear wheel for supplying torque required for the mechanical drive, the input shaft of the gear wheel being supported by first and second ball or roll bearings, and passing through a first wall of the using via a first opening positioned opposite the accessory and closed by a first accessory cover attached to the housing and passing through a second wall of the housing via a second opening closed by a second cover attached to the housing,
   wherein outer races of the first and second bearings are supported by the first accessory cover and the second cover, respectively,
   wherein the first accessory cover includes an axial extension which extends axially and penetrates into the first opening, the axial extension of the first accessory cover supporting the outer race of the first bearing,
   wherein an external face of the housing is flat and the first opening includes a cutout which receives the axial extension, extension the cutout and the axial extension cooperating to ensure positioning of the first accessory cover on the housing and to prevent rotation of the first accessory cover around the cutout, wherein the axial extension includes a projection including a bore, the outer race of the first bearing includes a hole, and a fastener passes through the bore of the projection of the axial extension and the hole of the outer race of the first bearing, and wherein a material of the first accessory cover is different than a material of the housing, and the material of the first accessory cover is more temperature-resistant than the material of the housing.

2. An accessory gearbox according to claim 1, wherein the gear wheel is coupled to the input shaft in addition to coupling thereof to the accessory mounted on the housing, the outer race of the first bearing being attached to the first accessory cover associated with a shaft of the accessory and the outer race of the second bearing being attached to the second cover associated with the input shaft.

3. An accessory gearbox according to claim 1, wherein the gear wheel is coupled to an alternator.

4. An accessory gearbox according to claim 1, wherein the housing is made of AS7G06 aluminum alloy and the first accessory cover is made of AU2GN aluminum alloy.

5. An accessory gearbox according to claim 1, wherein the axial extension extends an entire depth of the first opening.

6. An accessory gearbox for a turbine engine, comprising
a housing;
first and second gear wheels installed for mechanically driving accessories mounted on the housing;
a first input shaft which drives the first gear wheel for supplying the torque required for said mechanical drive, the first input shaft of the first gear wheel being supported by first and second ball or roller bearings, and passing through a first wall of the housing via a first opening positioned opposite an accessory driven by the first gear wheel and closed by a first accessory cover attached to the housing and passing through a second wall of the housing via a second opening closed by a second cover attached to the housing; and
a second shaft which drives the second gear wheel, being supported by third and fourth ball or roller bearings, and passing through the first wall of the housing via a third opening closed by the first accessory cover and passing through the second wall of the housing via a fourth opening closed by the second cover,
wherein outer races of the first and second bearings are supported by the first accessory cover and the second cover, respectively, and the outer race of the third bearing is supported by the second cover,
wherein the first accessory cover includes an axial extension which extends axially and penetrates the first opening, the axial extension of the first accessory cover supporting the outer race of the first bearing,
wherein an external face of the housing is flat, and the first opening includes a cutout which receives the axial extension, the cutout and the axial extension cooperating to ensure positioning of the first accessory cover on the housing and to prevent rotation of the first accessory cover around the cutout,
wherein the axial extension includes a projection including a bore, the outer race of the first bearing include a hole, and a fastener passes through the bore of the projection of the axial extension and the hole of the outer race of the first bearing, and
wherein a material of the first accessory cover is different than a material of the housing, and the material of the first accessory cover is more temperature-resistant than the material of the housing.

\* \* \* \* \*